(Model.)
T. D. LOCKWOOD.
Switch Board.
No. 239,299.  Patented March 22, 1881.
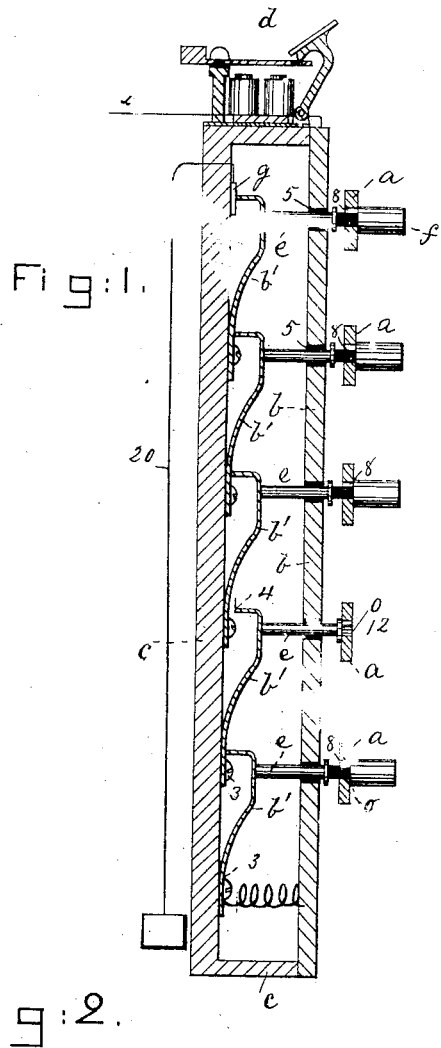
Fig:1.
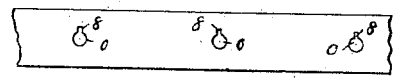
Fig:2.
Fig:3.
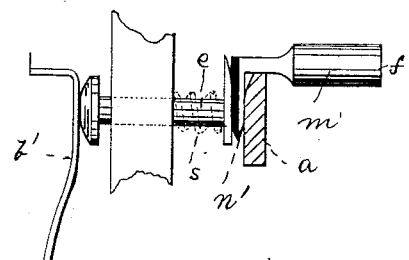
Fig:4.
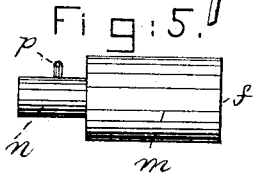
Fig:5.
WITNESSES
L. F. Connor,
Arthur Reynolds
INVENTOR
Thos. D. Lockwood
by Crosby & Gregory
Attys.

(Model.) 2 Sheets—Sheet 2.
T. D. LOCKWOOD.
Switch Board.
No. 239,299. Patented March 22, 1881.
Fig. 1ª
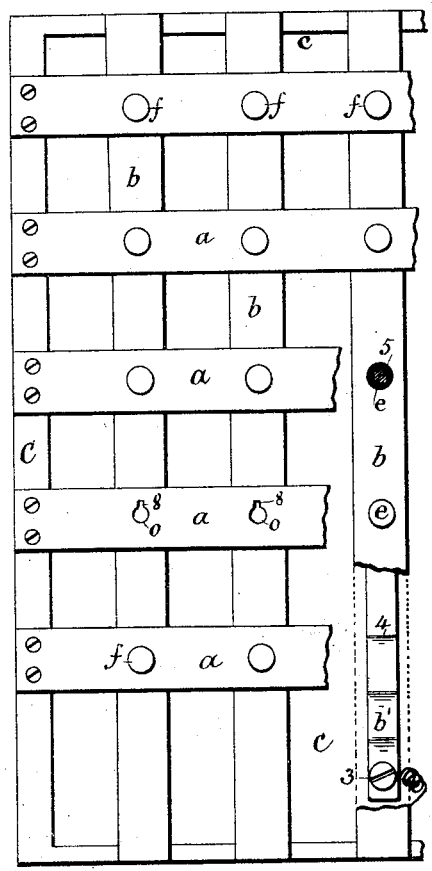
WITNESSES—
Philip Mauro
C. J. Hedrick
INVENTOR—
Thomas D Lockwood
by A Pollok
his attorney.

UNITED STATES PATENT OFFICE.

THOMAS D. LOCKWOOD, OF MALDEN, MASSACHUSETTS.

SWITCH-BOARD.

SPECIFICATION forming part of Letters Patent No. 239,299, dated March 22, 1881.

Application filed December 20, 1880. (Model.)

*To all whom it may concern:*

Be it known that I, THOMAS D. LOCKWOOD, of Malden, county of Middlesex, State of Massachusetts, have invented Improvements in Switch-Boards, of which the following description, in connection with the accompanying drawings, is a specification.

My invention relates to an electrical switch-board, intended especially for use in telephone-exchange systems. The switch-board contains a series of connecting-strips, shown as horizontal bars of brass placed in such relation to transverse conductors or line-strips, each forming a portion of an independent subscriber's circuit, that any one of the said series of connecting-strips may be connected with any desired two of the line-strips to complete the circuit from one to the other in the usual manner.

The invention consists, partly, in providing the said line-strips with circuit-closers, one to each horizontal strip, so constructed that they will automatically place themselves in connection each with its corresponding one of the said connecting-strips, except when positively disconnected therefrom by the forcible interposition of insulating material, suitable disconnecting-plugs being made for this purpose, and being normally interposed at every intersecting point of the two series of strips. When desired to make a connection between a line and connecting strip, the plug at the intersecting point of the two said strips is removed, permitting the connection to be formed. As herein shown, the vertical strips are each provided with a series of spring-pressed circuit-closers, which, when released by the withdrawal of a plug, are brought by the action of their springs into contact with the connecting-strip from which the plug was removed; and the invention consists, further, in such construction of the said circuit-closers that, by their movement to make the connection with the horizontal strips, they break the circuit of the line-strip beyond the point thus connected with the horizontal strip, so that the ground, which is, as usual in existing exchange systems normally connected with the central office terminal of the said subscribers' circuits, is removed therefrom by the operation of connecting the said circuits with one another.

I do not broadly claim a switch-board so constructed that the ground is removed from the line-strip by the operation of connecting it with a connecting-strip, as I am aware that this has been previously done by devices entirely different from those which I herein specifically lay claim to.

The invention further consists in certain details of construction, which will be hereinafter described and claimed.

Figure 1 is a vertical section of a switch-board constructed in accordance with my invention, the plane of section being through the middle of one of the line-strips; Fig. 1ª, a plan of such a switch-board, some of the parts being cut away, or shown in section, to more clearly illustrate the construction; Fig. 2, a detail, showing a portion of one of the horizontal connecting-strips and the plug-sockets therein; and Fig. 3 a modification, showing a different form of disconnecting-plug; Fig. 4, a transverse section of one of the horizontal strips shown in Figs. 1 and 2, on an enlarged scale; and Fig. 5 a side elevation of one of the disconnecting-plugs shown in Fig. 1, on an enlarged scale.

The horizontal connecting-strips $a$ and the vertical or line strips $b$ are arranged on the insulating frame-work $c$ of the switch-board in the usual manner, so that every strip of either series is traversed by all the strips of the other series. The line-strips are arranged side by side in the usual manner, and as they are or may be constructed alike the description of one will suffice for all.

The line-wire 2 of the subscribers' circuit passes through an indicating-instrument, $d$, of usual construction, and is connected with the vertical strip $b$, (shown as a bar of brass,) rigidly connected at both ends with the insulating frame-work $c$ of the switch-board. The said bar or strip $b$ is connected at its lower end with one of the series of springs $b'$, one corresponding to each of the horizontal connecting-strips $a$. Each of the said springs $b'$ is fastened at one end to the frame-work $c$, and extended beyond the line of the corresponding horizontal strip $a$, where its other end is in position to be pressed in contact with the next spring of the series near its fixed point, 3, the said springs each tending by its elastic force to retain its free end separated from the fixed end of the next spring of the series, as shown at 4.

A series of pins, e, of conducting material, and free to move longitudinally in insulated sockets 5 in the vertical strip b, are placed between the free ends of the springs b' and the horizontal strips a, so that the said springs b' will, by their elastic force, press the said pins e against the said horizontal strips a, to thus connect the said springs with the said strips. In the normal condition of the switch-board the pins e are separated from the horizontal strips a by disconnectors f, shown as plugs of insulating material, adapted to be inserted and retained in suitable sockets o in the said horizontal strips a. When all the said plugs are inserted, the springs b' are in electrical connection with one another, and form a continuation of the line-strips b and subscribers' circuit 2, the last one of the series of springs b' being pressed against an anvil, g, connected by wire 20 with the ground, to thereby normally close the subscribers' circuit 2 through the indicating-instrument d, for the purpose of signaling the central office subscribers' station in the usual manner.

It will be seen that the strip b, together with the springs b', when pressed into contact with one another, thus form a single continuous conductor from the indicating-instrument d, or point where the line-wire 2 is connected with the strip b, to the grounded anvil g; or, in other words, the bar b and springs b' together perform the function of the usual vertical or line strip, and will be hereinafter designated by that term. When the pins e are thus pressed by the plugs f to bring the springs b' into connection with one another the said springs, together with the whole subscribers' circuit and line-strips b b', are disconnected from all of the said horizontal strips, and the said circuit is complete to the wire 20 and the ground. When a subscriber on the circuit 2 desires to communicate with a subscriber on another similar circuit connected with a similar line-strip, b b', both the said line-strips have to be connected with the same horizontal strip and disconnected from the wire 20 and ground. Both of these operations are performed simultaneously by the removal of one of the plugs f, as shown at 12, when the corresponding spring b' throws its pin e into connection with the connecting-strip a, thus completing the circuit from the subscribers' line 2, through the strip b and springs b' below the one thus operated, and through the latter and its pin e to the said horizontal strip a, and by it to the other subscribers' circuit, connected therewith by a similar operation, while by the same movement the spring b' opposite to which the plug f was removed, as described, becomes disconnected at its free end 4 from the next spring b', and the following ones of the series connected with the wire 20 and the ground.

The plugs f are shown in Figs. 1 and 5 as consisting of an enlarged or handled portion, m, and a stem, n, of insulating material of proper size to be inserted in sockets o in the horizontal strips a. In order to insure that the said plugs shall be retained in place in the said socket, and not be thrown out by the force of the springs b', they are preferably provided with a pin, p, which passes through a notch, 8, formed in the strip a at the edge of the holes o, and when the said pin p has passed through the said notch, by giving the plug f a turn the said pin is made to engage the rear side of the horizontal strip a, to thereby retain the plug in place until, when it is desired to remove the plug, it is again turned to bring the pin in line with the notch.

In the form shown in Fig. 3 the plugs f are provided with tongues n', composed wholly or partly of insulating material, which, when inserted between the horizontal strip a and the pin e, break the electrical connection between them and press the latter against the spring b'. In this construction no sockets are required in the horizontal strips; but the edges of the said strips, together with the end of the tongue n, and, if need be, the head of the pin e, is curved or inclined to enable the tongue to be readily inserted.

The movable spring-pressed circuit-closing pins e may be employed in a switch-board in which the springs b' are not employed or form no part of the line-circuit, in which case the pins e would not be insulated from the vertical bars b. The lower horizontal strip, a, might then be connected with the ground, and the lower plugs be normally removed from their sockets, to thus electrically connect the vertical strips to the ground, and when a connection was made the plug which was removed from one of the upper horizontal connecting-strips would be placed in the lower socket, to thereby make the connection in the first operation and remove the ground in the second. In this case a spiral spring, s, Fig. 3, may be used instead of the spring b', which now has merely a mechanical function, to press the pin e against the strip a when the plug f is removed.

I claim—

1. In a switch-board, a series of line-strips and a series of connecting-strips combined with circuit-closers in permanent electrical connection with the several strips of one series, and springs tending to press said circuit-closers each into contact with a corresponding strip of the other series, substantially as described, so that the contact of said circuit-closers and the electrical connection between the strips of the two series is made by the force of said springs and broken by overcoming said force, as set forth.

2. In combination with a series of connecting-strips, a line-strip and a series of circuit-closers, as described, forming a part of the said strip, and movable into and out of contact with a corresponding connecting-strip, so that in establishing an electrical connection between the line-strip and the several connecting-strips the continuity of the line-strip is broken, as set forth.

3. In a switch-board, a series of horizontal or connecting strips and a series of vertical or line strips, combined with a series of spring-pressed circuit-closers permanently connected with each of the said line-strips, and disconnecting-plugs, to separate the said circuit-closers and connected line-strips from the horizontal strips, substantially as described.

4. In a switch-board, a series of strips provided with notched, round, plug-sockets, and a second series of strips transverse to the first, combined with a series of spring-operated circuit-closers, and disconnecting-plugs of insulating material, adapted, when inserted in the said sockets, to operate the said circuit-closers, and provided with pins to pass through the notches of the said sockets and engage the rear face of the strip, substantially as and for the purpose set forth.

In testimony whereof I have signed my name to this specification in the presence of two subscribing witnesses.

THOS. D. LOCKWOOD.

Witnesses:
   JOS. P. LIVERMORE,
   L. F. CONNOR.